June 30, 1959  C. W. OSNER  2,892,515
BEAMLESS BRAKE RIGGING
Filed April 4, 1955  3 Sheets-Sheet 1

Inventor
Clarence W. Osner
By Wayne Morris Russell
Attorney

June 30, 1959 C. W. OSNER 2,892,515
BEAMLESS BRAKE RIGGING
Filed April 4, 1955 3 Sheets-Sheet 2
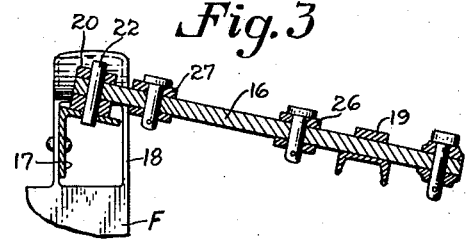
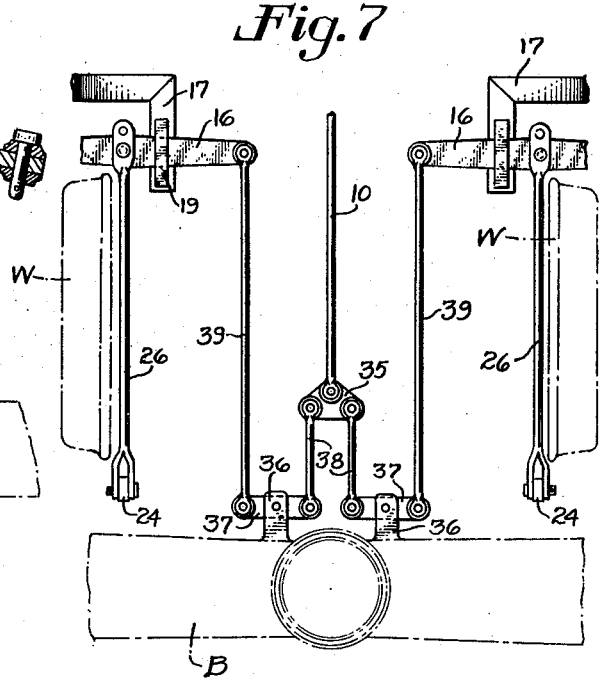
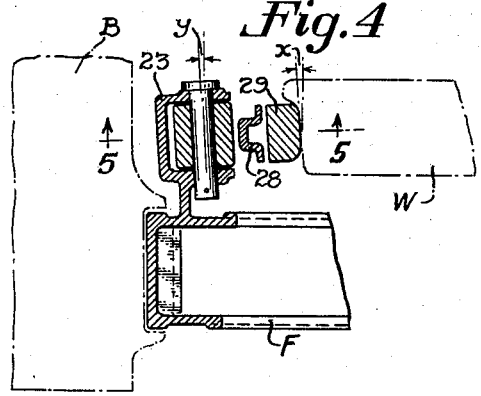
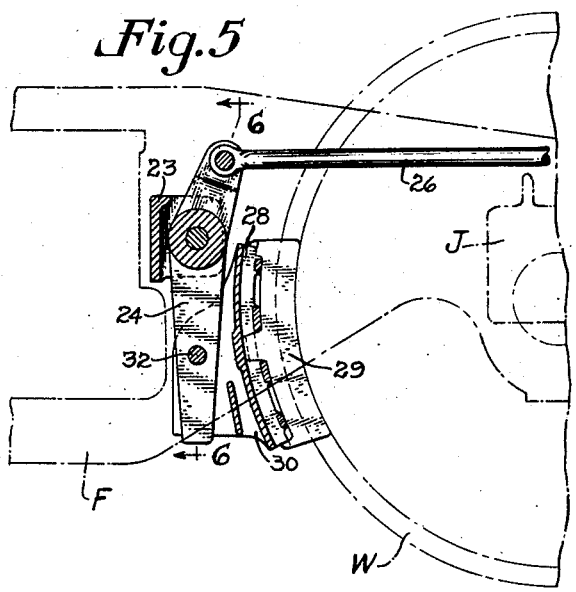
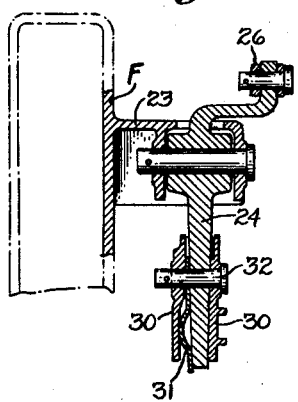
Inventor
Clarence W. Osner
By Wayne Morris Russell
Attorney June 30, 1959 — C. W. OSNER — 2,892,515
BEAMLESS BRAKE RIGGING
Filed April 4, 1955 — 3 Sheets-Sheet 3
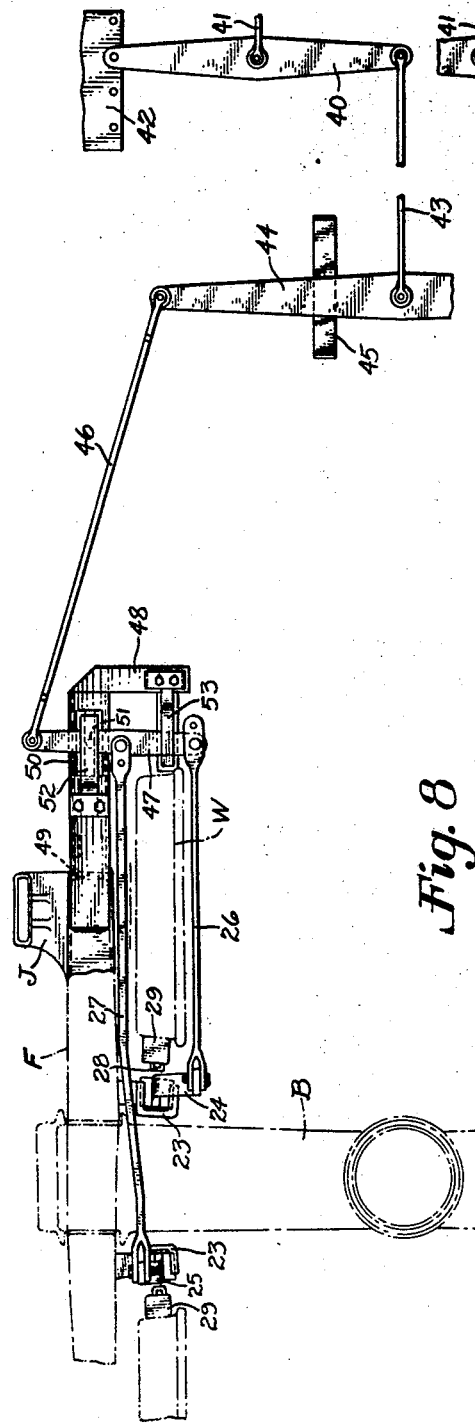
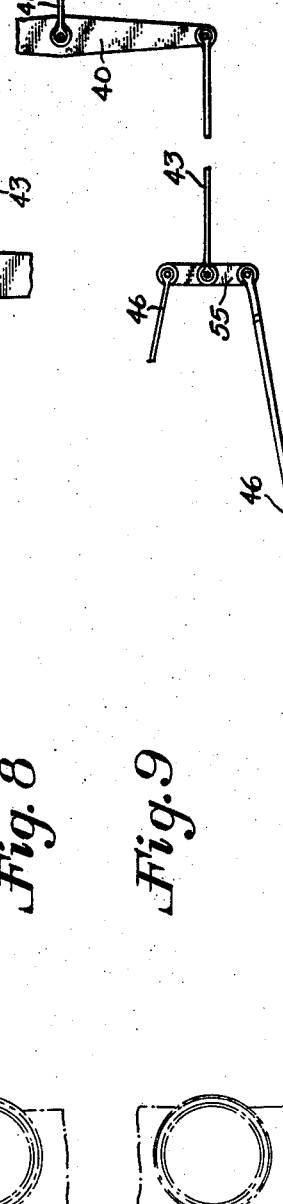
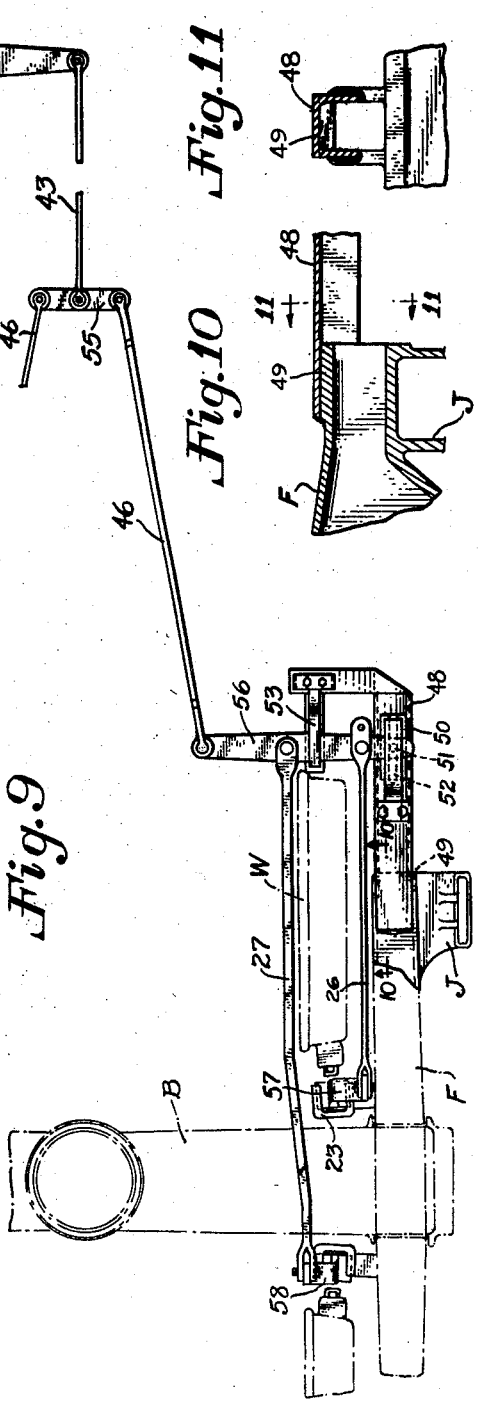
Inventor
Clarence W. Osner
By Wayne Morris Russell
Attorney

United States Patent Office 2,892,515
Patented June 30, 1959

2,892,515

BEAMLESS BRAKE RIGGING

Clarence W. Osner, Chicago, Ill.

Application April 4, 1955, Serial No. 499,052

9 Claims. (Cl. 188—52)

The present invention relates to beamless brake rigging for railway cars, and more particularly to such a brake rigging mounted on a truck particularly adapted for the purpose.

Railway car brakes commonly comprise truss-type brake beams extending transversely of the car and carrying brake shoes at their ends for engaging the wheels upon brake-applying movement of the truck brake levers. This conventional brake arrangement requires the use of safety supports for the brake beams to prevent derailment of the car in case of failure of a brake beam hanger, and also introduces unbalanced forces into the truck upon brake application, which are only partially corrected by the addition of brake balancers, tending to cause swiveling of the truck. These and other problems of and objections to the conventional type of brake rigging or gear have led to various proposals for beamless brake mechanisms eliminating brake beams and the hangers therefor and for improving the manner of application of the brakes, but all such proposals have themselves presented incompletely solved problems and difficulties. The present invention provides a beamless brake or rigging which avoids such problems and objections and provides important advantages.

One object of the present invention is the provision of a beamless brake rigging by which the brake-applying force on the wheels at opposite sides of the truck is equalized.

Another object is the provision of a brake rigging by which the brake-applying force on the wheels at the same side of the truck is equalized.

Another object is the provision of a brake rigging by which during application of brake-applying force the line of force passes approximately through the swivel axis of the truck when the car is on a curve, so that the same setting of the brakes is attained for a given slack adjustment regardless of the relative rotated position of the truck and car body.

Another object is the provision of brake rigging in which brake-applying force is transmitted by means acting at all times substantially in line with the swivel axes of the trucks and close to the truck bolster.

A further object is the provision of a beamless brake rigging by which the brake shoes are applied squarely against the wheel tread surfaces.

A still further object is the provision of a brake rigging in which the brake levers carrying the brake shoes are pivoted to swing in planes normal to the respective wheel tread surfaces by brackets integral with the truck side frames extending at an angle thereto corresponding to the taper or slope of the tread surfaces.

It is also an object of the invention to provide a brake rigging in which the brake levers carrying the brake shoes at the same side of the truck are connected by linkage including a floating lever free to move longitudinally of the truck to equalize the force urging each of the shoes against the wheels.

Another object is the provision of brake rigging comprising linkage interconnecting the brake levers carrying the brake shoes at the same side of the truck which includes a floating lever free to move longitudinally of the truck but prevented from lateral movement so as to effect equalization of the force urging each of the shoes against the wheels.

A further object is the provision of a support secured to a bracket integral with the truck side frame providing support portions substantially in the plane of the side frame and inwardly thereof for mounting a portion of a brake rigging.

Another object is the provision of a side frame having a bracket integrally formed therewith for securement of a support having portions extending substantially in the plane of the side frame and inwardly thereof to mount loosely a portion of a brake rigging.

Another object is the provision of a brake rigging in which the brake-applying force is applied through a loosely mounted lever at each side of the truck to which the brake levers carrying the brake shoes at the adjacent side of the truck are connected at points spaced transversely of the truck to act in opposition to each other for equalizing application of the brake shoes.

Another object is the provision of brake rigging in which brake-applying force acting in one direction is transmitted in an opposed direction to loosely mounted levers at opposite sides of the truck through reversing means on the truck close to the swivel axis thereof.

Still another object of the invention is the provision of a brake rigging in which the brake-applying force is applied through loosely mounted levers at opposite sides of the truck by means equalizing the force acting on each of the levers.

A further object is the provision of a brake rigging including a pair of rods extending on opposite sides of a wheel connecting shoe-carrying brake levers for each of a pair of wheels at one side of the truck to a lever extending transversely of the one wheel.

Another object is the provision of brake rigging including a brake head pivoted on a brake lever, in which resilient pressure means are provided for frictionally holding the brake lever and head against relative rotation.

Other and further objects, advantages, and features of the invention will be apparent to those skilled in the art from the following description and the accompanying drawings, in which Fig. 1 is a plan view of one embodiment of the invention, with the truck shown mainly in phantom;

Fig. 3 is an enlarged vertical sectional view taken substantially as indicated by the line 3—3 of Fig. 1;

Fig. 4 is an enlarged horizontal sectional view taken substantially as indicated by the line 4—4 of Fig. 2;

Fig. 5 is a vertical sectional view taken substantially on the line 5—5 of Fig. 4;

Fig. 6 is a vertical sectional view taken substantially as indicated by the line 6—6 of Fig. 5;

Fig. 7 is a partial plan view of another embodiment of the invention, showing portions of the truck in phantom;

Fig. 8 is a partial plan view of another embodiment of the invention, showing somewhat more than half of the rigging;

Fig. 9 is a partial plan view similar to Fig. 8, but showing another embodiment of the invention;

Fig. 10 is an enlarged vertical sectional view taken substantially as indicated by the line 10—10 of Fig. 9; and Fig. 11 is a vertical sectional view taken substantially as indicated by the line 11—11 of Fig. 10.

Figure 1:
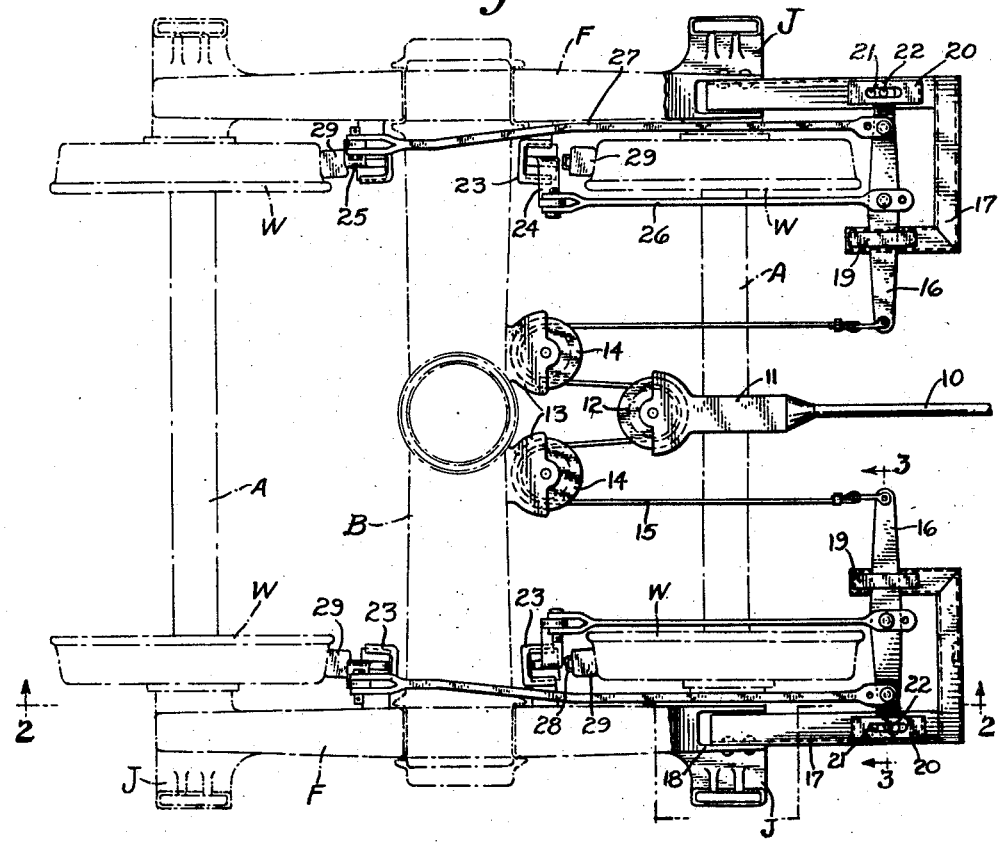
Figure 2:
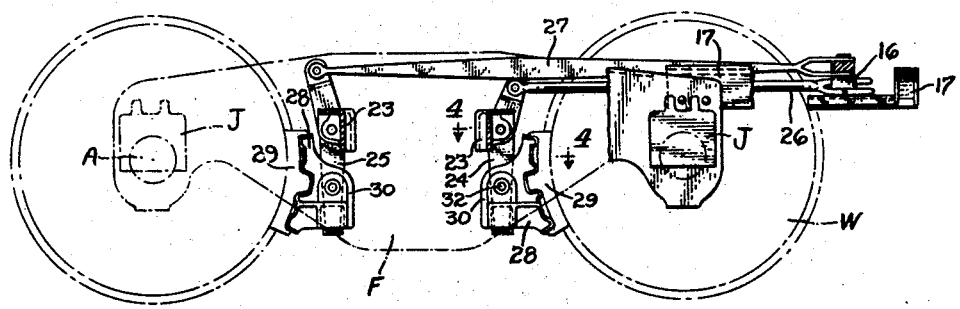
Fig. 2 is a vertical sectional view taken substantially as indicated by the line 2—2 of Fig. 1.

Referring to the drawings, there is shown in Figs. 1 and 2 one embodiment of the present invention applied to a railway car truck having two pairs of wheels W, each pair being mounted on an axle A journaled at its opposite ends in boxes J on the truck side frames F. A truck bolster B mounted on the side frames in any known manner provides for connection of the truck to the car. A brake rod or like member 10 supported by the car body extending longitudinally and centrally of the car has an end extending over one of the axles centrally of the pair of wheels and close to the bolster, with a clevis 11 secured thereon rotatably mounting a sheave 12 disposed in a horizontal plane. Fixed on and desirably integral with the truck bolster in opposed relation to the clevis 11 is a pair of laterally spaced brackets 13 each journaling a sheave 14. A cable 15 or similar flexible element is reeved about the sheaves 12 and 14 with its central portion engaging the sheave 12 and its end portions extending from the sheaves 14 past the sheave 12 and connected to operating levers 16 at opposite sides of the truck. Each of the levers 16 extends transversely of one of the pair of wheels on the axle over which the brake rod 10 extends, being loosely mounted on a support 17 secured to a bracket 18 formed integrally with the adjacent side frame F at the end thereof. Each support 17 is shown in Figs. 1 to 3 as comprising an angle member having one end disposed between a pair of upwardly extending laterally spaced flanges integral with the inner and outer web portions of the side frame to provide the bracket 18, a vertically disposed flange of the angle member being riveted or otherwise suitably secured to one of the bracket flanges. The angle member projects horizontally from the side frame substantially in the vertical longitudinal plane thereof to a point beyond the adjacent wheel W, and to its unsupported end is secured a transverse portion of the support 17, in the form of a channel member which extends laterally inwardly and is inclined downwardly. A longitudinally extending substantially horizontal channel member extends longitudinally from the inner end of the transverse portion in the direction of the bolster B, and parallel to the angle member forming the outer portion of the support 17. On the inner and outer longitudinal portions of each support are guides 19 and 20, respectively. Each operating lever 16 extends through the adjacent guide 19 and has its outer end disposed in the guide 20. Each guide 20 and the flange of the support angle member on which it is secured is formed with registering longitudinal slot 21 in which is engaged a pin 22 fixed in the outer end of the lever 16. The levers are thus free to move on the supports 17 longitudinally thereof, but are prevented from movement laterally of the supports, that is, transversely of the car or truck.

Each side frame has on its inner face, preferably integral therewith, a pair of pivot brackets 23, one adjacent each of the wheels at that side of the truck, each bracket 23 having a pair of laterally spaced lugs between which is pivoted a generally vertical brake lever, by means of a suitable pin. The brake lever 24 adjacent the wheel at which the support 17 is provided has its upper portion offset to extend laterally inwardly of the wheel, while the brake lever 25 adjacent the other wheel at the same side of the truck is offset laterally outwardly at its upper portion. A pair of longitudinally extending connecting rods 26 and 27, disposed respectively inwardly and outwardly of the wheel at which the support 17 is provided, link the brake lever 24 and the brake lever 25 to the operating lever 16. As best shown in Figs. 1 and 2, the short power arm of brake lever 24 is connected to rod 26 wherein the force is the sum of the forces in rod 27 and cable 15, while the long power arm of brake lever 25 is connected to rod 27 wherein the force is considerably less than that of rod 26. It is also obvious that proper proportioning of the power arms of levers 24 and 25, and proper combination with the proportioning of lever 16, is essential in order to produce desired equalization of all shoe pressures. Each rod is pivotally connected at one end to the respective brake lever and at the other end to the operating lever, their points of connection to the lever 16 being spaced longitudinally thereof, or transversely of the truck. The ends of the connecting rods pivoted to the operating lever may be bifurcated as shown and provided with a plurality of holes for adjustment by means of the pivot pin members connecting the operating lever and the rods 26 and 27. On the lower portion of each of the brake levers is pivoted a brake head 28 which carries a brake shoe 29 for engagement with the tread of the adjacent wheel. Each brake head has a pair of ears 30 between which the lower portion of the brake lever extends, a pin 32 projecting through the ears and lever to pivotally secure the brake head and lever together. A spring is disposed between the brake lever and one of the brake head ears for normally holding the brake head and lever against relative rotation about the pin 32 by frictional engagement therebetween, the spring being shown in Fig. 6 as a resilient strip 31 with a bowed portion bearing against the lever and said one ear 30. The strip may conveniently be secured in position by the provision of an aperture therein receiving the pin 32.

The wheels W, in accordance with standard practice, are provided with tapered treads, that is, have their tread portions forming a frustum rather than a cylinder. To improve the braking qualities and provide for more even and reduced wear, the brake shoes are arranged to bear squarely and flatly on the wheel tread surfaces. This is accomplished by disposing the brackets 23 at a slight angle to the side frame such that the axes of the brake lever pivot pins and of the pins 32 parallel the tread surface of the adjacent wheel. This is clearly shown in Fig. 4, in which the angle indicated at $x$ represents the slope or taper of a wheel tread surface relative to a line or plane normal to the longitudinal axis of the truck, and the angle indicated at $y$ represents the corresponding angle of the pin axes. The slope of the wheel tread surface is the standard one of 1 in 20.

It will be apparent that when the brake rod 10 moves away from the bolster B, to the right as viewed in Fig. 1, the inner ends of the operating levers 16 will be moved longitudinally of the supports 17 in the direction of the bolster, the direction of action of the brake-applying force transmitted by the rod 10 being reversed by the cable and sheaves. By reason of the connections of the operating levers to the rods 26 and 27, the outer ends of levers 16 will tend to move longitudinally of the supports away from the bolster, although they are not constrained to such movement and may move toward the bolster. The movement of the operating levers causes movement of the connecting rods to swing the respective brake levers in a direction to apply the brake shoes against the wheels to stop rotation thereof. Normally one or the other of the connecting rods 26 and 27 at each side of the truck is moved sufficiently to swing its associated brake lever 24 or 25 far enough to bring the associated brake shoe into contact with its wheel before the other rod causes application of its associated brake shoe to the other wheel at the same side of the truck, whereupon the connection of the first-acting rod serves as a fulcrum about which the operating lever 16 is swung to cause further brake-applying movement of the second-acting rod. The rods thus act against each other, and the more firmly one shoe is applied, the greater the force which acts to apply the other. In this manner, the brake application force of both shoes at each side of the truck is equalized through the connection of the rods 26 and 27 to the operating lever 16 at spaced points. It will be clear that the connecting rods move in opposite directions to apply the respective brake shoes, the rod 26 moving toward the bolster to swing the brake lever 24 counterclockwise as viewed in Figs. 2 and 5 to bring the brake shoe against the wheel, and moving away from the bolster to swing the brake lever clockwise for releasing the braking engagement, while the other rod 27 and brake lever 25 move oppositely thereto in the corresponding actions.

As best shown in Figs. 2 and 5, the brake levers 24 and 25 are pivoted in the brackets 23 at points above the level of the upper ends of the brake shoes 29, so that when the brakes are released the shoes will swing clear of the wheels.

Instead of the arrangement employing the cable 15 to transmit braking force from the pull rod 10 to the operating levers 16, an arrangement of rigid rods such as illustrated in Fig. 7 may be employed. As shown, the pull rod has its end adjacent the bolster B pivoted to a triangular yoke member 35, and a pair of transversely spaced spaced pivot brackets 36 are provided on the bolster, and may be integral therewith as in the case of the brackets 13. In each bracket 36 is pivoted a short horizontal lever 37 extending transversely, and one of a pair of suitable rods or links 38 is pivotally connected to the inner end of each lever 37 and the yoke member 35. Extending between and pivotally connected to the outer end of each lever 37 and the inner end of the adjacent operating lever is a rod 39. Upon movement of the brake rod 10 in a direction away from the bolster to apply the brakes, the linkage just described causes the inner ends of the operating levers to move in the direction of the bolster. As in the case of the brackets 13 and sheaves 14 in the cable arrangement shown in Fig. 1, the brackets 36 and levers 37 serve to reverse the direction in which the brake-applying force is transmitted by the brake rod.

Another form the invention may take is shown in Fig. 8, in which a horizontal lever 40, which may be the floating lever of a conventional brake rigging, is fulcrumed at one end on a bracket 42 on the railway car body and has a rod 14 pivotally connected to its center. The rod 41 may be the floating lever connecting rod of conventional rigging. To the other or free end of the lever is pivoted one end of a longitudinal rod 43 disposed centrally under the car body. The other end of this rod is pivoted to the center of a transversely extending horizontal lever 44, which is loosely supported in a pair of U-shaped brackets 45, one at each side of its center, extending from the car body. Only one of these brackets is shown. To each of the ends of the transverse lever 44 is pivoted a rod 46 which extends to and is pivotally connected to the outer end of one of a pair of operating levers 47 each loosely mounted on a support 48. The levers 47 and supports 48 are generally similar to the operating levers 16 and supports 17 shown in Figs. 1 and 2. Each support is secured to the adjacent side frame by welding to a bracket 49 formed integrally with the side frame at the end thereof, as best shown in Figs. 10 and 11. Each support 48 has an outer longitudinally extending portion in the form of a channel member one end of which nests on the bracket 49, and is suitably welded thereto, with the depending flanges of the channel 48 welded to the ends of the bracket 49 as shown in Fig. 11. The channel member extends horizontally in a direction away from the bolster B to a point beyond the adjacent wheel W, and has a transverse portion secured thereto and extending downwardly and inwardly therefrom at that point. Extending longitudinally from the transverse portion in the direction of the bolster, and between the planes of the inner and outer faces of the adjacent wheel, is a third portion parallel to the outer portion of the support. The transverse and inner longitudinal portions of the support may be of any suitable form, as channel or angle members. The operating lever 47 extends transversely on the support with its outer end projecting beyond the outer support portion for connection to the rod 46 and its inner end extending somewhat beyond the inner longitudinal portion and the adjacent wheel. On the outer support portion is secured a block 50 with its upper face inclined parallel to the inner and transverse portions of the support and having therein a longitudinal slot or groove which receives a pin 51 fixed to the operating lever, which rests on the block and the inner support portion. The slot or groove in the block serves as slot means corresponding to the slots 21 previously described. A retainer or guide 52 is provided for the lever 47 in the form of a bent strip of resilient metal which has a flat tongue portion extending over the block 50 and bearing on the lever, and a downwardly extending portion at one end secured to the outer support portion as by a bolted clamping piece. A similar resilient guide 53 is provided extending over the inner portion of the support 48 and bearing on the lever 47. As shown in the drawings, the guide 53 is open in the direction of the bolster, while the guide 52 is open in the opposite direction. The functions of resilient guides 52 and 53 are to prevent chatter of lever 47 against its support normally caused by vertical vibration of the unsprung side frames. The lever is held against movement transversely or laterally of the support by the engagement of pin 51 in the groove of block 50.

The brake levers 24 and 25 pivoted in the brackets 23 and carrying the brake heads and brake shoes are provided on the truck substantially as shown in Figs. 1 to 6, and the respective connecting rods 26 and 27 are pivoted to the brake levers and to the associated operating lever 47. In this embodiment, however, the rod 26 is connected to the inner end of the adjacent operating lever, and the rod 27 is connected to the central portion of the lever, as evident from Fig. 8, the connections of the rods to the lever 47 being spaced laterally, or transversely of the truck, as in the case of the lever 16.

In the application of the brakes, the rod 41 is moved in a direction away from the bolster, swinging the floating lever 40 to draw the lever 44 in the same direction as the rod 41, so that the rods 46 move the operating levers 47 to cause engagement of the brake shoes 29 with the wheels substantially as described in connection with the embodiment of the invention shown in Figs. 1 and 2. With the arrangement of Fig. 8, the direction of application of the braking force is not reversed. In this embodiment, however, the power arm of lever 24 must be made longer than that of lever 25 in order to achieve equalization of shoe pressures, because the tensile force in rod 27 is numerically greater than the compressive force in rod 26.

In Fig. 9 there is shown an embodiment of the invention generally similar to that of Fig. 8, but differing in some respects. The floating lever 40 pivoted to the rod 41 and connected at its free end to the rod 43 is provided as in the structure shown in Fig. 8, but a relatively short transverse lever 55 is substituted for the lever 44, and pivoted to the rod 43 in place thereof. From the opposite ends of the lever 55 the rods 46 extend to the inner ends of respective operating levers 56 generally similar to the levers 16 and 47 already described, and mounted on the supports 48 secured to the brackets 49 integral with the side frames F. While the supports 48 are substantially the same as previously described and have the blocks 50 and resilient guides 52 and 53 secured thereon, the operating levers 56 differ from the levers 47 in that their outer ends do not project appreciably beyond the outer portions of the supports and their inner ends extend for a considerable distance inwardly of the inner support portions, and it is the inner ends of the levers which are pivoted to the rods 46. Each lever 56 has a pin 51 fixed therein and engaging in the grooved block 50, as in the case of the lever 47, but the pin is located adjacent the outer end of the lever.

The brake lever pivot brackets 23 are provided on the side frames substantially as previously described, and brake levers 57 and 58 are pivoted in the brackets and carry the brake heads 28 and shoes 29. The brake levers 57 and 58 are generally similar to the levers 24 and 25, respectively, but have their upper portions offset in the opposite direction, so that the brake lever 57 for the wheel adjacent the support 48 on each side frame extends into a plane between the wheel and the side frame, while the lever 58 for the wheel remote from the support 48 has its upper portion projecting inwardly. The connecting rods 26 and 27 are connected to the operating lever 56 in laterally or transversely spaced relation, as in the arrangement of Fig. 8, and to the respective brake levers 57 and 58, but the rod 26 connecting the brake lever 57 and operating lever 56 is disposed between the side frame and the adjacent wheel, while the rod 27 connecting the brake lever 25 to the operating lever lies inwardly of the adjacent wheel, as clearly shown in Fig. 9. In this embodiment the power arm of lever 57 must be made longer than that of lever 58 in order to achieve equalization of shoe pressures, because, similar to the embodiment illustrated in Fig. 8, the pull rod 27, which is applied to lever 58, is necessarily greater than the push applied by rod 26 to lever 57.

The operation of the structure of Fig. 9 is substantially the same as that of the invention as illustrated in Fig. 8. Upon movement of the rod 41 in a direction away from the bolster B, the short transverse lever 55 and thereby the rods 46 are moved in that same direction, thus moving the operating levers 56 to shift the connecting rods 26 and 27 and swing the associated brake levers 57 and 58 so as to engage the brake shoes against the respective wheels.

It is to be noted that according to the invention, the braking force applied by the air brake cylinder or other means, for example a hand brake, acts along the longitudinal center lines of the car and truck and passes exactly through the swivel axis when the car is on tangent track, whereas the body pull rod of conventional brake riggings in normal applied position has an eccentricity of about fifteen inches with respect to the swivel axis. This eccentricity is the factor that introduces unbalanced forces into the truck upon brake application which tend to cause undesired swiveling of the truck. Such eccentricity increases or decreases when the truck swivels, and the amount of change depends upon the degree and direction of truck rotation produced by curvature of tracks to right or to left. Since attachment of the body pull rod to the truck line lever is located about twenty inches from the longitudinal center line of bolster, this point of attachment must sweep through a large circular arc, the center of which is the swivel axis of the truck. Consequently, such point of attachment must move a considerable distance away from or toward the brake cylinder and hand brake, depending upon the amount and direction of rotation of the truck about its swivel axis. Therefore, when the braking force is produced by a pneumatic cylinder, adjustment to the arcuate path of such point of connection is accomplished by movement of the piston in the cylinder which tends to increase or decrease cylinder air pressures and thereby produces variations in pressures of brake shoes against the wheels. However, when the braking force is produced by the hand brake, and the brake is set rigidly, shoe pressures will be released by rotation of the truck in one direction and increased by rotation in the opposite direction; in fact, increases in braking force in this manner, produced by large degrees of track curvature, can be large enough to stretch hand brake rods and chains and bend levers in the hand brake system. On the other hand, inadvertent movement of a car from tangent track to curved track, or vice versa, without releasing the hand brake, can reduce brake shoe pressure sufficiently to cause a runaway car when certain grade and curvature conditions occur.

In the present invention the braking force passes exactly through the swivel axis of the truck when the car is on tangent track and approximately so when the car negotiates curved track. Therefore, undesired swivel of the truck due to unbalanced forces introduced by brake application is entirely absent when the car is on straight track. Moreover, the unbalanced forces are insignificant when the car negotiates a curve, because the braking force acting on the truck is only slightly eccentric with the longitudinal center line of car, even when large track curvatures are encountered. Consequently, movements of the brake cylinder piston and large variations in brake pressures, which can occur when cars having conventional truck brakes enter or leave curved track, are eliminated in the present invention.

It will be evident that not only is the brake-applying force on each of the brake shoes at the same side of the truck equalized by the linkage of the brake lever connecting rods to the operating lever, as previously explained, but that the brake-applying forces acting at the opposite sides of the truck, or in other words on the two operating levers, are equalized by means of the invention. Such equalization is effected by the cable and sheave arrangement shown in Fig. 1, the yoke, rod, and lever arrangement of Fig. 7, and the transversely extending horizontal lever 44 or 55 of Figs. 8 or 9 centrally pivoted to the central longitudinally extending rod 43 and thus acting as an equalizing lever.

What is claimed is:

1. A beamless brake rigging for a railway car having a supporting truck with a plurality of wheels at each side thereof, comprising a support member extending from one side of the truck at an end thereof adjacent one of the wheels at said one truck side having a pair of parallel longitudinally extending arms adjacent said one wheel to provide laterally spaced supports, a floating lever member extending generally transversely of said one wheel movably carried on said supports, means for guiding movement of the lever member longitudinally on said supports, means preventing movement of the lever member laterally on the supports, a pair of connecting rods extending longitudinally on opposite sides of said one wheel pivotally connected to the lever member at laterally spaced points, a pair of brake levers pivoted at intermediate points thereof on the truck between said one wheel and an adjacent wheel at said one truck side to swing each about a substantially horizontal axis and having the upper ends thereof laterally offset in opposite directions to extend respectively inwardly and outwardly relative to said one wheel and pivotally connected to said connecting rods, brake shoes on the lower ends of the brake levers for engaging the respectively adjacents wheels upon swinging of the upper ends of the levers in opposed directions away from the respective wheels, and means for moving the lever member to shift the connecting rods in opposite directions for swinging the upper brake lever ends in said opposed directions thereof.

2. A beamless brake rigging for a railway car having a supporting truck with a plurality of wheels at each side thereof, comprising a support member extending from one side of the truck at an end thereof adjacent one of the wheels at said one truck side having a pair of parallel longitudinally extending arms adjacent said one wheel to provide laterally spaced supports, a floating lever member extending generally transversely of said one wheel movably carried on said supports, means for guiding movement of the lever member longitudinally on said supports, means preventing movement of the lever member laterally on the supports, a pair of connecting rods extending longitudinally on opposite sides of said one wheel pivoted to the lever member at laterally spaced points, a pair of brake levers pivoted at intermediate points thereof on the truck between said one wheel and an adjacent wheel at said one truck side to swing each about a substantially horizontal axis and having the upper ends thereof laterally offset in opposite directions to extend respectively inwardly and outwardly relative to said one wheel and pivotally connected to said connecting rods, brake shoes on the lower ends of the brake levers for engaging the respectively adjacent wheels upon swinging of the upper ends of the levers in opposed directions away from the respective wheels, and means connected to the lever member laterally inwardly of the pivot connections of the connecting rods to the lever member for moving the lever member to shift the connecting rods in opposite directions for swinging the upper brake lever ends in said opposed directions thereof.

3. A beamless brake rigging for a railway car having a supporting truck with a plurality of wheels at each side thereof, comprising a support member extending from one side of the truck at an end thereof adjacent one of the wheels at said one truck side having a pair of parallel longitudinally extending arms adjacent said one wheel to provide laterally spaced supports, a floating lever member extending generally transversely of said one wheel movably carried on said supports, means for guiding movement of the lever member longitudinally on the supports, means preventing movement of the lever member laterally on the supports, a pair of connecting rods extending longitudinally on opposite sides of said one wheel pivoted to the lever member at laterally spaced points, a pair of brake levers pivoted at intermediate points thereof on the truck between said one wheel and an adjacent wheel at said one truck side to swing each about a substantially horizontal axis and having the upper ends thereof laterally offset in opposite directions to extend respectively inwardly and outwardly relative to said one wheel and pivotally connected to said connecting rods, brake shoes on the lower ends of the brake levers for engaging the respectively adjacent wheels upon swinging of the upper ends of the levers in opposed directions away from the respective wheels, and means connected to the lever member laterally outwardly of the pivot connections of the connecting rods to the lever member for moving the lever member to shift the connecting rods in opposite directions for swinging the upper brake lever ends in said opposed directions thereof.

4. A beamless brake rigging for a railway car having a supporting truck with a plurality of wheels at each side thereof, comprising a support member extending from one side of the truck at an end thereof adjacent one of the wheels at said one truck side having a pair of parallel longitudinally extending arms adjacent said one wheel to provide laterally spaced supports, a floating lever member extending generally transversely of said one wheel movably carried on said supports, means for guiding movement of the lever member longitudinally on the supports, means preventing movement of the lever member laterally on the supports, a pair of connecting rods extending longitudinally on opposite sides of said one wheel pivoted to the lever member at laterally spaced points, a pair of brake levers pivoted at intermediate points thereof on the truck between said one wheel and an adjacent wheel at said one truck side to swing each about a substantially horizontal axis and having the upper ends thereof laterally offset in opposite directions to extend respectively inwardly and outwardly relative to said one wheel and pivotally connected to said connecting rods, brake shoes on the lower ends of the brake levers for engaging the respectively adjacent wheels upon swinging of the upper ends of the levers in opposed directions away from the respective wheels, and operating means connected to the lever member to transmit a brake-applying force acting in a predetermined direction thereto for moving the lever member to shift the connecting rods in opposite directions for swinging the upper brake lever ends in said opposed directions thereof including means on the truck closely adjacent the swivel axis thereof reversing the direction of action of the brake-applying force.

5. A beamless brake rigging for a railway car having a supporting truck with a plurality of wheels at each side thereof, comprising a pair of support members extending from opposite sides of the truck at corresponding ends thereof each adjacent one of the wheels at the respective truck side and having a pair of parallel longitudinally extending arms adjacent the respective wheel to provide laterally spaced supports, a pair of floating lever members each extending generally transversely of said respective wheel movably carried on the supports of one of said support members, means for guiding movement of the lever members longitudinally on the supports, means preventing movement of the lever members laterally on the supports, two pairs of connecting rods at the opposite truck sides having the rods of each pair extending longitudinally on opposite sides of the respective wheel and pivoted to the adjacent lever member at laterally spaced points, a pair of brake levers at each truck side pivoted at intermediate points thereon on the truck between said respective wheel and another wheel at the same truck side to swing each about a substantially horizontal axis and having the upper ends pivotally connected to the adjacent pair of connecting rods, brake shoes on the lower ends of the brake levers for engaging the associated wheels upon swinging of the upper ends of the levers in opposed directions away from the wheels, means for transmitting brake-applying force to said lever members, and equalizing means operatively connected to said transmitting means and lever members for substantially equalizing the brake-applying force acting on both said lever members.

6. A brake rigging for a railway car having a supporting truck with a pair of wheels at each side thereof, comprising support means adjacent an end of the truck providing a pair of laterally spaced supports adjacent one of the wheels at one of the truck sides, a lever member carried transversely on said supports and movable longitudinally thereof, means preventing movement of said lever member laterally of the supports, a pair of brake levers pivoted at intermediate points thereof on the truck between the pair of wheels at said one side to swing in substantially vertical planes, a pair of connecting rods extending longitudinally on opposite sides of said one wheel pivoted to said lever member at spaced points thereof and each also pivotally connected to an end of one of the brake levers, brake shoes mounted on the other ends of the brake levers for engagement with the wheels at said one truck side upon swinging of the first-mentioned ends of the levers in opposed directions, and means for operating said lever member.

7. A brake rigging for a railway car having a supporting truck with a pair of wheels at each side thereof, comprising support means adjacent an end of the truck providing a pair of laterally spaced supports adjacent one of the wheels at one of the truck sides, a lever member carried transversely on said supports and movable longitudinally thereof, means preventing movement of the lever member laterally of the supports, a pair of brake levers pivoted at intermediate points thereof on the truck each adjacent a wheel at said one side to swing in substantially vertical planes, a pair of connecting rods extending longitudinally on opposite sides of said one wheel pivoted to said lever member at spaced points thereof and each also pivoted to the upper end of one of the brake levers, brake shoes mounted on the lower ends of the brake levers for engagement with the wheels at said one truck side upon swinging of the upper brake lever ends in opposed directions, and means for moving the lever member to move the connecting rods longitudinally in opposite directions.

8. A beamless brake rigging for a railway car having a supporting truck with a plurality of wheels at each side thereof, comprising a pair of support members extending longitudinally from opposite sides of the truck at corresponding ends thereof each adjacent one of the wheels at the respective truck side, a pair of floating lever members each extending generally transversely of one of the support members and the adjacent wheel and movably carried on the support member, means preventing movement of the lever members laterally on the support members, two pairs of connecting rods at the opposite truck sides having the rods of each pair extending longitudinally on opposite sides of the respectively adjacent wheel and pivoted to the adjacent lever member at laterally spaced points, a pair of brake levers at each truck side pivoted on the truck between the wheels at the respective sides to swing each about a substantially horizontal axis and pivoted to the adjacent pair of connecting rods, brake shoes on the brake levers engageable with the wheels, an elongated transversely extending equalizing member pivotally connected at its end portions to said lever members, and means for transmitting brake-applying force pivotally connected to the equalizing member centrally of said end portion connections.

9. In a beamless brake rigging for a railway car truck having a pair of brake levers each pivoted on the truck between the wheels at each side to swing about a substantially horizontal axis and carrying a brake shoe for engaging an adjacent wheel, the combination of a floating lever member at each side of the truck extending substantially transversely of the wheels at the respective truck side, a pair of connecting rods at each side of the truck extending longitudinally on opposite sides of one of said wheels at the respective truck side and pivoted at one end to the adjacent lever member at spaced points thereof and each pivoted at the other end to one of the brake levers at the adjacent truck side, means for transmitting brake-applying force connected to each of the lever members at a point thereof laterally spaced in the same direction from both said connections of the adjacent connecting rods thereto for fulcruming of the lever member on one of said rod connections upon transmission of brake-applying force to the lever member.

References Cited in the file of this patent
UNITED STATES PATENTS

| | | |
|---|---|---|
| 893,306 | Clark | July 14, 1908 |
| 1,098,808 | Kiesel | June 2, 1914 |
| 1,987,658 | Aurien | Jan. 15, 1935 |
| 2,124,056 | Doud et al. | July 19, 1938 |
| 2,169,960 | Cottrell | Aug. 15, 1938 |
| 2,343,939 | Tack | Mar. 14, 1944 |
| 2,613,766 | Miers | Oct. 14, 1952 |
| 2,685,942 | Bachman | Aug. 10, 1954 |
| 2,697,498 | Casey | Dec. 21, 1954 |